Feb. 9, 1960        B. C. HOLBEN        2,924,323

CONVEYOR STOP GATE

Filed April 27, 1959

Inventor
Bernard C. Holben

United States Patent Office 2,924,323
Patented Feb. 9, 1960

2,924,323

CONVEYOR STOP GATE

Bernard C. Holben, Dublin, Ohio, assignor to Industrial Nucleonics Corporation, a corporation of Ohio Application April 27, 1959, Serial No. 809,268

7 Claims. (Cl. 198—1)

This invention relates generally to conveyor systems for transporting a plurality of articles, and more particularly, to gating devices for automatically stopping the flow of said articles.

Mechanical conveyor systems are employed as an economical means for expediting the flow of articles from point to point and have recently been developed to automatically sort and route incoming articles to specific destinations. Further through the use of branched conveyor networks, diverting gates and electronic read stations along the path of the incoming articles, it is possible to dispatch articles to a desired location by merely coding the same upon entry to the sorting area. Such a system is disclosed in co-pending U.S. application Serial No. 764,579 filed October 1, 1958 by William R. Clore.

In these systems it is necessary to provide means along the path of the articles to stop the flow thereof when the desired destination is obtained. In addition, it is oftentimes desirable that each article be spaced a predetermined distance from the one immediately preceding to enable selective re-routing of one article onto a branch conveyor without interfering with the normal flow of succeeding articles. In either case, stop-gates must be mounted along the conveyors at predetermined points and adapted to be released into the path of the articles.

In one prior art system there was pivotally mounted a bar having a hook-shaped end on the side of the conveyor and when it was desired to halt a particular article, the bar was swung toward the center of the conveyor thereby positioning the hook end of the bar in the path of the article. These gating devices were powered by electrical solenoids which were noisy in operation and unreliable in checking the movement of a large article. Considerable space was required for mounting these devices. In addition, they were not satisfactory for individually stopping articles laid end to end.

These and other difficulties are overcome by the apparatus of the present invention, whereby a movable strike plate and mounting means therefor are located below the level of belt-driven roller-type conveyor. The strike plate is adapted to be raised above the conveyor level to engage the leading edge of an on-coming article. The unique, rugged construction taught by the present invention enables the stop-gate to straddle the driving belts also located beneath the conveyor level, while at the same time permitting maximum utilization of the available space.

Accordingly, it is a primary object of the present invention to provide a novel stop-gate which may be mounted on a belt-driven conveyor.

It is another object of the present invention to provide for a roller-type conveyor a gate which is capable of selectively stopping any given article in a series regardless of their spacing.

It is also an object of the present invention to provide for a roller-type conveyor a gate having greater, more positive stopping power than similar devices used heretofore.

It is still another object of the present invention to provide for a roller-type conveyor a stop-gate which is exceedingly quiet in operation.

It is yet another object of the present invention to provide a compact stop-gate which may be inconspicuously mounted on existing roller-type conveyors.

In addition to these objects, many other advantages may be accomplished by the present invention. These advantages as well as numerous features of the present invention will become more apparent from the following detailed description when viewed in conjunction with the appended drawings, in which.

Although the present invention is adapted for modification and applicable to a variety of alternate uses, the same is hereinafter illustrated and described in connection with a conveyor system for expediting the processing of the mails. A full description of such a system may be found by referring to aforementioned co-pending application.

Figure 1:
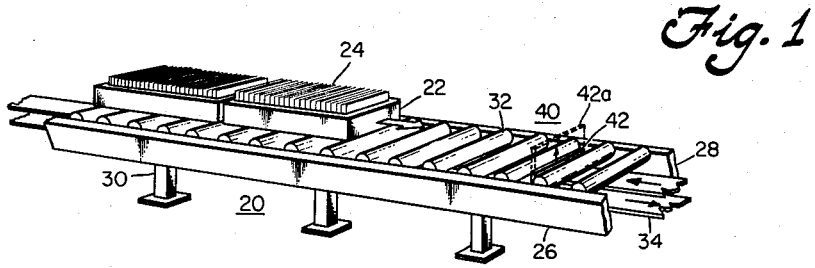
Fig. 1 is a partial perspective view of a preferred embodiment of the present invention.

With reference now to the drawings and specifically to Fig. 1, there is shown a section of conveyor 20 adapted to transport a tray 22 bearing a quantity of mail 24 and moving in the direction indicated by the large arrow. Conveyor 20 is typically constructed with a pair of spaced, parallel sides 26 and 28 supported by a plurality of legs 30. A series of rollers 32 are suitably journaled in bearings and mounted between the sides 26 and 28. A continuous belt 34 is located beneath the rollers 32 and driven by a motor and drum arrangement (not shown). The upper section of the traveling belt 34 is maintained in communication with the rollers 32. By driving the belt in the direction indicated by the arrow, power is transmitted to the rollers 32 thereby propelling the tray 22 as shown.

At times it is desirable to stop the movement of the tray 22 without disrupting the movement of the conveyor 20. For example, trays 22 are quite frequently placed contiguous to one another on the conveyor 20 as shown; however, for purposes set forth in the above cited co-pending application, it is highly desirable that there be at least a minimum separation between successive trays. Therefore, a spacing station is required which will hold the trays and release them one at a time.

To accomplish this result, the present invention provides a stop-gate 40 having a striker plate 42 extending substantially across the lateral dimension of conveyor 20 and positioned below the level of the conveyor 20 and between a pair of adjacent rollers 32. In the closed position of the stop-gate 40, the plate 42 is adapted to be raised above the level of the conveyor by means described in detail hereinafter. In its raised position 42a, the striker plate engages the leading edge of the tray 22 thereby stopping the same. After a brief moment, the plate 42 is lowered and the tray continues on down the conveyor. Whereupon, the plate 42 is again raised to check the movement of a following tray. If the trays are closely spaced, it has been the practice to raise the plate 42 before a previously-stopped tray has traveled sufficiently down the conveyor to clear the stop-gate. This practice assures that the tray immediately following will be stopped by the plate 42.

Figure 2:
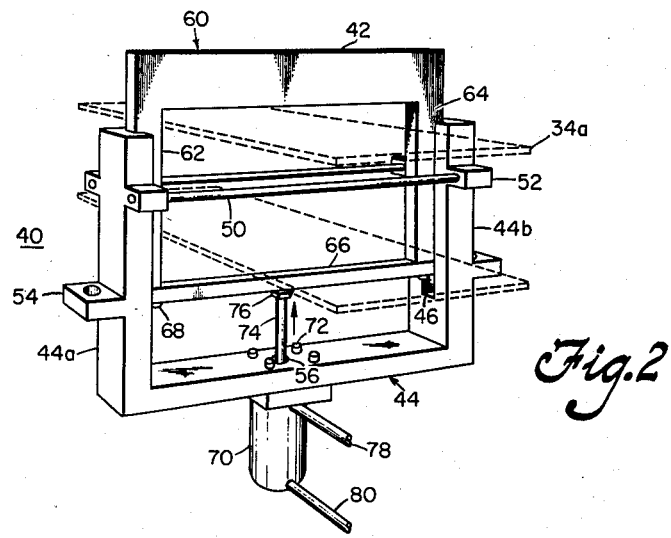
Fig. 2 is a detailed perspective view of apparatus utilized in Fig. 1 and constructed in accordance with the teachings of the present invention; and, Fig. 3 is a block diagram illustrating a typical actuator means for energizing the stop gate shown in Fig. 1 and Fig. 2.

With conveyors of the type shown and others, it has been difficult to mount a stop-gate under the conveyor 20. The presence of the belt 34 has created a problem whereby the physical size of the stop-gate and mounting assembly interferred with the normal operation of the traveling belt. Referring to Fig. 2, the present invention contemplates a uniquely constructed stop-gate 40 which encircles the belt 34 and yet may be made sufficiently rugged to halt any size tray 22 transported by the conveyor 20.

In Fig. 2, a U-shaped mounting bracket 44 comprises a bronze casting having a slot 46 milled in the inner face of each of a pair of upwardly extending side guides 44a and 44b. To maintain constant separation of the upwardly extending guides 44a and 44b, a pair of spacer bars 50 may be provided near the upper terminus of said guides by securing the same to ears as at 52. The mounting bracket 44 is also fabricated with a pair of ears 54 extending outwardly from the guides 44a and 44b for the purpose of securing the same to the underside of the conveyor sides 26 and 28. A hole 56 is also bored in the center of the lower cross-member of the U-shaped mounting bracket 44.

Slots 46 accommodate a generally rectangular shutter 60 slidably mounted therein. Shutter 60 is provided with a centrally located aperture through which the traveling belt 34 may pass. For purposes of clarity, the belt is shown in phantom and denoted by the dotted line 34a. A pair of vertically aligned slides 62 and 64 may be welded to opposite ends of the striker plate 42. A removable lower bar 66 is bolted at 68 to the alternate ends of the slides 62 and 64. Shutter 60 is durably constructed of cold-rolled steel stock.

The vertical position of the shutter 60 in the slots 46 is determined by a fluid-operated cylinder driving device 70 fastened by four bolts 72 to the underside of the mounting bracket 44. A piston rod 74 extending from the cylinder 70 is passed upwardly through the hole 56 and secured to the lower bar 66 of the shutter 60 by a jam nut 76. A pair of pressure hoses 78 and 80 are connected to the end-ports of the cylinder 70 and serve to transmit either hydraulic or pneumatic pressure to the reciprocating piston located in the cylinder 70. In a well known manner, a differential pressure existing between lines 78 and 80 will cause linear motion to be imparted to the piston rod 74. Since shutter 60 is connected to the piston rod 74 it is driven thereby, the limit of travel of the shutter being governed by stops provided in the cylinder 70. The cylinder 70 is chosen such that the striker plate 42 is positioned sufficiently above the rollers 32 to engage the tray 22 when the piston rod 74 is in fully extended position. Similarly, in its fully retracted position, the piston rod 74 should enable the striker plate 42 to clear the path of trays traveling on conveyor 20.

Figure 3:
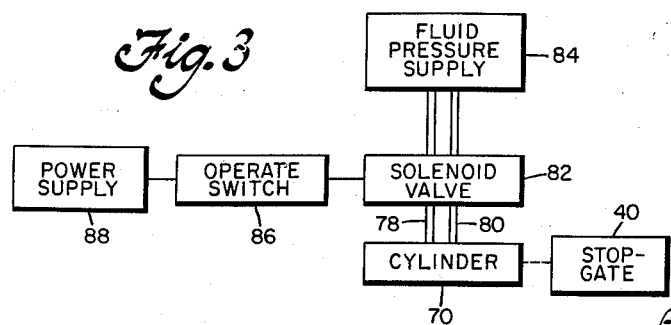

A typical actuating circuit for the stop-gate 40 is diagrammatically shown in Fig. 3. Referring to Fig. 3, a solenoid-operated valve 82 is interconnected with a fluid pressure supply shown generally at 84 and the cylinder 70. An operate switch 86, which may be either automatic or manual, serves to transmit electrical power to the solenoid valve 82 from a supply 88. To open the stop-gate 40, switch 86 is opened to de-energize the valve 82. Usually, a powerful spring is provided in the cylinder 70 to return the piston when pressure is removed from the end ports. If it is desired to maintain the stop-gate in closed position, holding circuits may be quite readily devised to operate in conjunction with the operate switch 86. Also, if a tray-spacing function is to be provided by the stop-gate 40, suitable timer means may be used to hold the stop-gate closed for a predetermined interval. While either a hydraulic or pneumatic system may be utilized for the purpose of driving the cylinder 70, the changes and modifications necessary to adapt each to a given installation will be apparent to one skilled in the art; therefore, further explanation is considered unnecessary.

Although the installation and operation of the present invention may be apparent from the foregoing discussion, the same is now briefly set forth. Once the location for the stop-gate 40 is decided upon, the mounting bracket 44 and the cylinder 70 may be secured to the underside of conveyor 20. The lower bar 66 of the shutter 60 is rigidly fastened by the jam nut 76 to the piston rod 74. The remaining part of the shutter 60, viz., the striker plate 42 and associated slides 62 and 64, is inserted downwardly between a pair of adjacent rollers 32 to engage the slots 46 of the mounting bracket 44. Lower bar 66 is then connected to the slides 62 and 64 to form an integral assembly. Difficulty in fastening the ends of the lower bar 66 to the slides 62 and 64 may be lessened by reducing the thickness of the guides 44a and 44b of the mounting bracket where they join the cross-member. This practice will allow ample clearance for a wrench or other implement when joining the two sections of the shutter 60. The spacers 50 may then be inserted between the upper and lower sections of the belt 34 and fastened to the ears 52.

Even though the present invention is described and illustrated in connection with a preferred embodiment, it should be regarded merely as an example, since many additions, substitutions and omissions may be made thereto without departing from the spirit and scope of the present invention as set forth in the claims.

What is claimed is:

1. A stop-gate for a traveling conveyor having a plurality of belt-driven rollers for transporting a series of articles comprising, a movable shutter having a central opening, means for slidably mounting said shutter, means for mounting said shutter mounting means under said conveyor, means for continuously passing said driving belt through said central opening in said shutter, and means connected to said shutter for moving said shutter from a first position clearing the path of said articles to a second position blocking said path.

2. In a traveling conveyor having a plurality of belt-driven rollers for transporting a series of articles, a stop-gate comprising a rectangular shutter having a central opening, a U-shaped mounting bracket having a pair of upwardly extending guides for slidably engaging opposite sides of said shutter, means for mounting said U-shaped mounting bracket under said conveyor, means for continuously passing said driving belt through said central opening in said shutter, drive means connected to said shutter, and means for energizing said drive means to move said shutter upwardly in said U-shaped mounting bracket from a first position clearing the path of said articles to a second position blocking said path.

3. In a traveling conveyor having a plurality of belt-driven rollers for transporting a series of articles, a stop-gate comprising a rectangular shutter having a central opening, a U-shaped mounting bracket having a pair of upwardly extending guides for slidably engaging opposite sides of said shutter, means for mounting said U-shaped mounting bracket under said conveyor, means for continuously passing said driving belt through said central opening in said shutter, reciprocating drive means connected to said shutter, actuator means, and means for connecting said actuator means to said reciprocating drive means to move said shutter upwardly in said U-shaped mounting bracket from a first position clearing the path of said articles to a second position blocking said path.

4. The subcombination substantially as set forth in claim 3 in which said reciprocating drive means comprises a fluid-operated cylinder driving device.

5. A stop-gate for a traveling conveyor having a plurality of belt-driven rollers for transporting a series of articles comprising, a movable shutter including a striker plate, a pair of spaced slides extending downwardly from opposite ends of said striker plate, and a lower bar spaced from said striker plate and connected to each of said slides, said striker plate, said slides and said lower bar defining a generally rectangular aperture; a U-shaped mounting bracket including a pair of spaced guides, milled slots provided in each of said guides for receiving said shutter slides, and a cross-member connected to the lower ends of said spaced guides; means for locating said U-shaped bracket under said conveyor, the plane of said shutter being situated substantially perpendicular to the direction of transport of said articles, means for continuously passing said driving belt through said aperture, a fluid-operated cylinder driving device, means for connecting said driving device to said lower bar, actuator means, and means for connecting said actuator means to said driving device to move said shutter upwardly in said guides from a first position clearing the path of said articles to a second position blocking said path.

6. A stop-gate for a traveling conveyor having a plurality of belt-driven rollers for transporting a series of articles comprising, a movable shutter including a striker plate, a pair of spaced slides extending downwardly from opposite ends of said striker plate, and a lower bar spaced from said striker plate and connected to each of said slides, said striker plate, said slides and said lower bar defining a generally rectangular aperture; a U-shaped mounting bracket including a pair of spaced guides, milled slots provided in each of said guides for receiving said shutter slides, and a cross-member connected to the lower ends of said spaced guides; means for locating said U-shaped bracket under said conveyor, the plane of said shutter being positioned substantially perpendicular to the direction of transport of said articles, means for continuously passing said driving belt through said aperture, a fluid-operated cylinder driving device, means for connecting said driving device to said lower bar, actuator means, switch means having a first state for connecting said actuator means to said driving device to move said shutter from a first position clearing the path of said articles to a second position blocking said path and a second state for disconnecting said actuator means from said driving device to return said shutter from said second position to said first position, and operator means connected to said switch means for moving said switch from one state to the alternate.

7. A stop-gate substantially as set forth in claim 6 in which said U-shaped mounting bracket is constructed of bronze material.

References Cited in the file of this patent

UNITED STATES PATENTS 2,528,868    Dederich _____ Nov. 7, 1950